United States Patent
Kapfer et al.

(10) Patent No.: US 8,651,988 B2
(45) Date of Patent: Feb. 18, 2014

(54) DEFLECTION PULLEY FOR A TRACTION MEANS

(75) Inventors: Benoit Kapfer, Brumath (FR); Jacky Herrmann, Dannelbourg (FR); Constant Einsetler, Griesbach (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1174 days.

(21) Appl. No.: 12/095,863

(22) PCT Filed: Nov. 28, 2006

(86) PCT No.: PCT/EP2006/068968
§ 371 (c)(1),
(2), (4) Date: Jul. 2, 2008

(87) PCT Pub. No.: WO2007/063055
PCT Pub. Date: Jun. 7, 2007

(65) Prior Publication Data
US 2008/0300077 A1    Dec. 4, 2008

(30) Foreign Application Priority Data
Dec. 1, 2005   (DE) .................. 10 2005 057 297

(51) Int. Cl.
*F16H 7/00* (2006.01)
*F16H 7/12* (2006.01)
*F16H 7/20* (2006.01)
*F16H 55/36* (2006.01)

(52) U.S. Cl.
USPC ..................... 474/101; 474/135; 474/199

(58) Field of Classification Search
USPC ............ 474/70, 101, 132, 135, 199; 384/448, 384/486
See application file for complete search history.

(56) References Cited

U.S. PATENT DOCUMENTS

| | | | | | |
|---|---|---|---|---|---|
| 1,733,968 | A | * | 10/1929 | Klieber | 474/132 |
| 2,198,831 | A | * | 4/1940 | Moyer | 474/177 |
| 2,701,430 | A | * | 2/1955 | Lorig | 451/297 |
| 3,490,285 | A | * | 1/1970 | Donath et al. | 474/187 |
| 3,537,725 | A | * | 11/1970 | Frost | 384/480 |
| 3,770,992 | A | * | 11/1973 | Veglia | 384/489 |
| 4,113,328 | A | * | 9/1978 | Vander Meulen | 384/482 |

(Continued)

FOREIGN PATENT DOCUMENTS

| | | |
|---|---|---|
| DE | 3719479 | 12/1988 |
| DE | 9307931 | 7/1993 |

(Continued)

*Primary Examiner* — William A Rivera
*Assistant Examiner* — Henry Liu
(74) *Attorney, Agent, or Firm* — Volpe and Koenig, P.C.

(57) ABSTRACT

A tensioning device for a traction element, such as a belt, band or chain, is provided having a tensioning arm (1) arranged on a machine part on which an idler pulley or deflection pulley for the traction element is rotatably mounted via a roller bearing (2), and includes a protective cap (15) which is in a frictionally locking or positively locking manner on the idler pulley and covers the bearing region of the idler pulley. The idler pulley is a sheet-metal sheave (16) and includes, for securing the protective cap (15), a snap-in groove (17) which is formed in an end region of the sheet-metal sheave (16) which has an outwardly conical shape, with the end region having a thickness (A) which is less than a thickness (E) of the sheet metal of the sheet-metal sheave (16).

2 Claims, 2 Drawing Sheets

(56) References Cited

U.S. PATENT DOCUMENTS

| | | | |
|---|---|---|---|
| 4,602,875 A * | 7/1986 | Doerr et al. | 384/547 |
| 5,449,328 A * | 9/1995 | Schmidt et al. | 474/135 |
| 6,065,943 A * | 5/2000 | Suito et al. | 417/362 |
| 6,083,130 A * | 7/2000 | Mevissen et al. | 474/70 |
| 6,270,001 B1 * | 8/2001 | Tadic et al. | 228/245 |
| 6,394,247 B1 * | 5/2002 | Monahan et al. | 192/41 S |
| 6,652,336 B1 * | 11/2003 | Chambers | 440/75 |
| 6,854,893 B2 * | 2/2005 | Schmidt | 384/486 |
| 7,011,593 B2 * | 3/2006 | Schenk et al. | 474/199 |
| 7,108,623 B2 * | 9/2006 | Cadarette et al. | 474/199 |
| 7,435,005 B2 * | 10/2008 | Schmidl et al. | 384/480 |
| 2005/0026729 A1 * | 2/2005 | Schenk et al. | 474/101 |
| 2006/0188190 A1 * | 8/2006 | Schmidl et al. | 384/477 |

FOREIGN PATENT DOCUMENTS

| | | |
|---|---|---|
| DE | 29609380 | 8/1996 |
| DE | 29612471 | 9/1996 |
| DE | 10024318 | 11/2001 |
| DE | 10209673 | 9/2003 |
| DE | 10333673 | 2/2005 |
| DE | 10333876 | 2/2005 |
| EP | 0694703 | 1/1996 |

* cited by examiner

DEFLECTION PULLEY FOR A TRACTION MEANS

BACKGROUND

The invention relates to a deflection pulley or a tensioning device for a traction element, such as a belt, band, or chain, with a tensioning arm, which is arranged on a machine part so that it can pivot and on which a deflection pulley for the traction element is mounted so that it can rotate via a roller bearing, and with a protective cap, which covers the bearing region of the deflection pulley and which is secured on the deflection pulley with a non-positive and/or positive fit connection.

With the protective cap of a deflection pulley or a tensioning device, the bearing region of the deflection pulley should be protected against the penetration of contaminants and sprayed water.

It is already known not to connect the protective cap of the deflection pulley to the deflection pulley with a non-positive or positive fit connection, but instead to construct it as a protective plate, which forms an annular gap with the deflection pulley. In this way, between the rotating deflection pulley and the protective plate fixed relative to the deflection pulley, a labyrinth seal is created, which, however, still does not allow the desired high sealing effect.

It is also known to form a rim for the detachable mounting of the protective cap on the deflection pulley with a steel sheave. Here, however, e.g., raising the edge of the rim through roll deformation requires an additional processing step in the manufacturing process of the deflection pulley, which results in extra costs.

The publication DE 100 24 318 A1 shows a tensioning device of the type noted above. As emerges there from FIG. 1 of the drawing, a protective cap is set axially on a hub of the deflection pulley and secured there with a friction fit connection. For such an arrangement with a steel sheave, it is also known to form a snap-in groove on the hub of the deflection pulley through turning. The protective cap can engage in this snap-in groove with a bead, so that a positive-fit connection is created. This, however, involves an expensive solution due to the necessary additional turning process.

SUMMARY

The invention is based on the objective of creating a deflection pulley or an idler device with a deflection pulley-protective cap unit, which guarantees a high degree of protection against the penetration of contaminants and sprayed water, wherein the deflection pulley should be manufactured in a simple process without additional processing steps.

This objective is met according to the invention in such a way that the deflection pulley is constructed as a sheet-metal sheave and has, for securing the protective cap, a snap-in groove, which is formed by an end region of the sheet-metal sheave deformed conically outward, wherein the end region has a smaller thickness dimension relative to the sheet-metal thickness of the sheet-metal sheave.

In this way, the deflection pulley constructed as a sheet-metal sheave can be manufactured completely by a single drawing process, e.g., on a transfer press. Here, the proposed snap-in groove for securing the protective cap is also produced during the drawing process of the sheet-metal sheave. In this configuration, additional manufacturing processes, such as raising the edge of the end region through roll deformation or the turning finishing work for forming a snap-in groove is avoided. For producing the snap-in groove, the material of the sheet-metal sheave only in the end region receiving the protective cap needs to be drawn thinner than in the other regions, after which the end region can be formed conically outward, in order to form the snap-in groove.

Due to the snap-in geometry according to the invention, the protective cap can be placed axially on the deflection pulley and drawn from there, without negatively affecting the snap-in function. The protective cap thus seals the bearing region of the deflection pulley from penetration of contaminants and streams of water.

BRIEF DESCRIPTION OF THE DRAWINGS

An embodiment of the invention is shown in the drawing and is described in more detail in the following in comparison with deflection pulley configurations according to prior state of the art.

Shown in partial sections are.

DETAILED DESCRIPTION OF THE PREFERRED EMBODIMENTS

Figure 1:
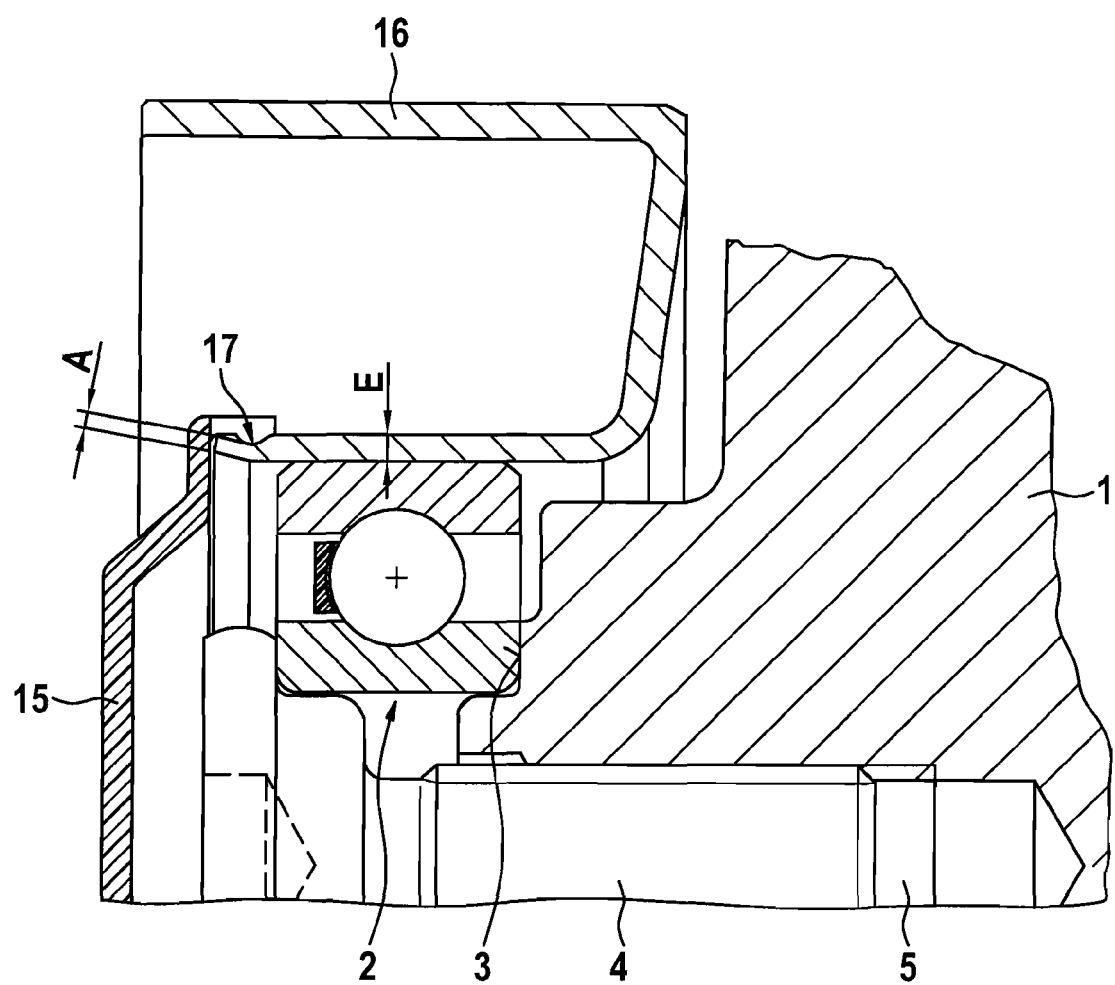
FIG. 1—an axial section view of a deflection pulley or idler roller-protective cap unit according to the invention, which is arranged on a tensioning arm, and FIGS. 2 to 4—views of three known deflection pulley-protective cap units in diagrams corresponding to FIG. 1.

The units shown in the figures of the drawing are each secured on a tensioning arm 1, which is mounted so that it can pivot on a not-shown machine part. The machine part can be mounted, for example, on an internal combustion engine. On each tensioning arm 1, a deflection pulley for a traction element is mounted so that it can rotate via a roller bearing 2. The rotational axis of the roller bearing 2 here extends parallel to the pivot axis of the tensioning arm 1. The bearing inner ring is supported axially on a contact face 3 of the tensioning arm 1 and is secured there by a screw 4, which is screwed into a threaded borehole 5 of the tensioning arm 1. The sheave 13 is mounted on the bearing outer ring of the roller bearing 2. The bearing region of the roller bearing 2 is covered and sealed outward with a protective cap 15, which attaches to an axial end of the deflection pulley.

Figure 2:
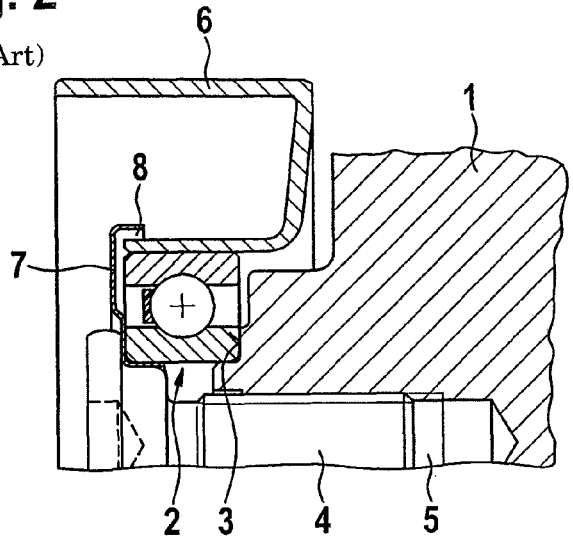

The unit shown in FIG. 2 has a deflection pulley, which is configured as a sheet-metal sheave 6. Its inner part acting as a hub is enclosed by a protective cap configured as a protective plate 7, wherein an annular gap 8 is maintained between the sheet-metal sheave 6 and the protective plate 7. In this way, a labyrinth seal of the region of the roller bearing 2 is formed. This, however, does not allow the desired high sealing effect.

Figure 3:
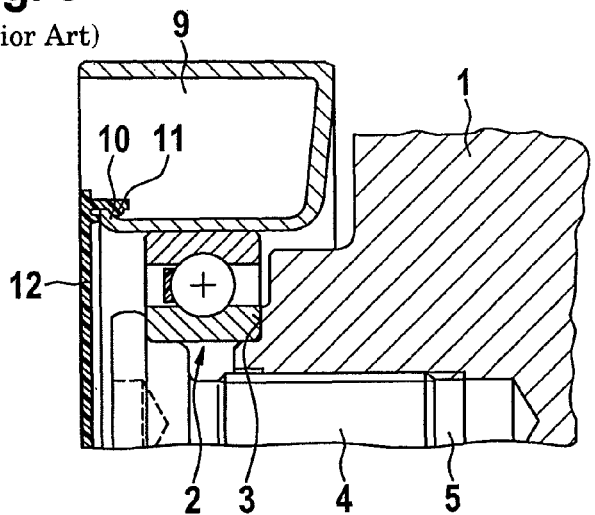

The unit according to FIG. 3 likewise has a deflection pulley, which is configured as a sheet-metal sheave 9. The sheet-metal sheave 9 is provided with a formed rim 10, which is encompassed by a bead 11 of a protective cap 12. This sheet-metal sheave 9 has the disadvantage that for the production of the rim 10, an additional processing step is required.

Figure 4:
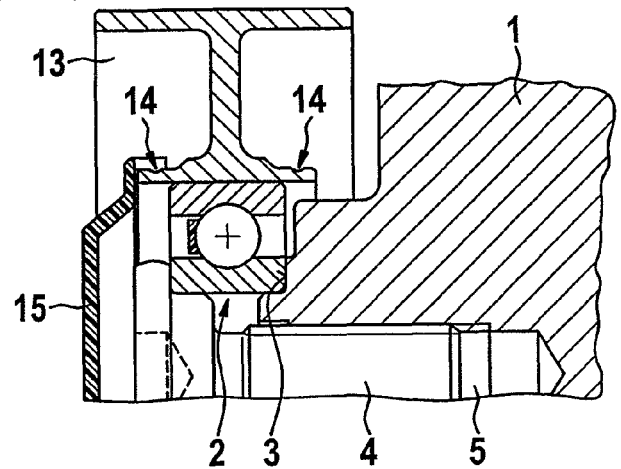

FIG. 4 shows a solid sheave 13 with a hub, in whose two axial end regions, snap-in grooves 14 are machined on the outer periphery. A protective cap 15 is placed on the hub of the deflection pulley 13 and is secured there with shaped beads, which engage in the adjacent snap-in groove 14. This configuration requires the formation of snap-in grooves 14, for example, through turning, as an additional work stage in the manufacturing of the sheave 13.

The deflection pulley-protective cap unit shown in FIG. 1 has a protective cap 15, as shown in FIG. 4, and a deflection pulley formed as a sheet-metal sheave 16. According to the invention, a snap-in groove 17 is configured in an axial end region of the hub part of the sheet-metal sheave 16 in such a way that the sheet-metal thickness "A" is here smaller than the sheet-metal thickness "E" in the remaining profile of the sheet-metal sheave 16 and that this end region is deformed conically outward. Such a sheet-metal sheave 16 has the advantage that it can be formed with the snap-in groove 17 in a single work stage of the work process.

REFERENCE SYMBOLS

1 Tensioning arm
2 Roller bearing
3 Contact face
4 Screw
5 Threaded borehole
6 Sheet-metal sheave
7 Protective plate
8 Gap
9 Sheet-metal sheave
10 Rim
11 Bead
12 Protective cap
13 Sheave
14 Snap-in groove
15 Protective cap
16 Sheet-metal sheave
17 Snap-in groove
A Thickness measure
E Sheet-metal thickness

The invention claimed is:

1. A tensioning device for a traction element, comprising a tensioning arm, a machine part on which the tensioning arm is arranged so that the tensioning arm can pivot, and an idler or deflection pulley mounted on the tensioning arm so that the idler or deflection pulley can rotate via a roller bearing located on the tensioning arm, and a protective cap covers a bearing region of the idler or deflection pulley and is secured on the idler or deflection pulley with a friction or positive fit connection, the idler or deflection roller is a formed sheet-metal sheave consisting of an inner axially extending sheet-metal wall having an end integrally connected with a radially outwardly extending sheet-metal wall, and an outer axially extending sheet-metal wall is integrally connected to an outer end of the radially extending sheet-metal wall, and for connection of the protective cap, the inner axially extending sheet-metal wall includes a snap-in groove, which is formed by deforming a free end region of the inner axially extending sheet-metal wall conically outwardly, and the free end region of the inner axially extending sheet-metal wall has a reduced thickness in comparison to a wall thickness of the sheet-metal walls of the sheet-metal sheave away from the conically outwardly shaped free end region.

2. The tensioning device of claim 1, wherein an radially inner side of the conically outwardly shaped free end region of the inner axially extending sheet metal wall is angled outwardly from an axis of the idler or deflection pulley.

* * * * *